(12) United States Patent
Veshchikov

(10) Patent No.: US 12,346,839 B2
(45) Date of Patent: Jul. 1, 2025

(54) SYSTEM AND METHOD OF FUZZING PREVENTION USING INTENTIONAL RESPONSES THAT APPEAR TO BE RANDOMIZED

(71) Applicant: NXP B.V., Eindhoven (NL)

(72) Inventor: Nikita Veshchikov, Brussels (BE)

(73) Assignee: NXP B.V., Eindhoven (NL)

(*) Notice: Subject to any disclaimer, the term of this patent is extended or adjusted under 35 U.S.C. 154(b) by 219 days.

(21) Appl. No.: 17/993,735

(22) Filed: Nov. 23, 2022

(65) Prior Publication Data

US 2024/0169226 A1 May 23, 2024

(51) Int. Cl.
*G06N 7/02* (2006.01)
*H04L 9/06* (2006.01)

(52) U.S. Cl.
CPC ............ *G06N 7/023* (2013.01); *G06N 7/026* (2013.01); *H04L 9/0618* (2013.01); *H04L 9/0643* (2013.01)

(58) Field of Classification Search
CPC ...... G06N 7/023; G06N 7/026; H04L 9/0618; H04L 9/0643; G06F 18/2185; G06F 21/554; G06F 21/577; G06F 21/54
See application file for complete search history.

(56) References Cited

U.S. PATENT DOCUMENTS

| | | |
|---|---|---|
| 6,996,273 B2 | 2/2006 | Mihcak et al. |
| 9,015,667 B2 | 4/2015 | Meijer et al. |
| 9,036,943 B1 * | 5/2015 | Baldwin ............ G06T 7/38 382/284 |
| 10,452,526 B2 | 10/2019 | Rajpal et al. |

(Continued)

FOREIGN PATENT DOCUMENTS

| | | |
|---|---|---|
| CN | 109308415 A | 2/2019 |
| CN | 109597767 A | 4/2019 |

(Continued)

OTHER PUBLICATIONS

Güler et al., "AntiFuzz: Impeding Fuzzing Audits of Binary Executables", Aug. 2019, Proceedings of the 28th USENIX Security Symposium, pp. 1931-1947 (Year: 2019).*

(Continued)

*Primary Examiner* — Kenneth W Chang

(57) ABSTRACT

A system and method of responding to fuzzing including receiving a fuzzing input while in fuzzed mode, performing a perceptual hashing function using the fuzzing input to generate a perceptual hash value, selecting an action from a list of actions using the perceptual hash value, and performing the selected action in response to the fuzzing input. Parameters may be generated using the perceptual hash value for actions that use parameters. Instead of normal hashing, perceptual hashing generates the same hash value for substantially similar fuzzing inputs so that corresponding fuzzing response actions appear to be random but instead are intentional. Hardware or software version numbers may be combined with a shared secret key and hashed using a non-perceptual hashing function to further impede comparison analysis by a fuzzer. Some embodiments combine perceptual hashing with non-perceptual hashing, such as cryptographic hashing or the like.

19 Claims, 5 Drawing Sheets

(56) References Cited

U.S. PATENT DOCUMENTS

| | | | | |
|---|---|---|---|---|
| 10,491,782 B1* | 11/2019 | Zehler | ................... | G06F 3/1238 |
| 10,523,699 B1* | 12/2019 | Alamuri | .................. | H04L 63/08 |
| 10,713,151 B1* | 7/2020 | Zinger | ................ | G06F 11/3684 |
| 2011/0119293 A1* | 5/2011 | Taylor | ..................... | G06F 21/10 |
| | | | | 707/769 |
| 2011/0182422 A1* | 7/2011 | Anderson | ............... | G06F 21/64 |
| | | | | 380/28 |
| 2014/0201769 A1* | 7/2014 | Neumeier | .............. | H04N 5/765 |
| | | | | 725/14 |
| 2015/0309813 A1* | 10/2015 | Patel | ................... | G06F 11/3698 |
| | | | | 703/22 |
| 2017/0060732 A1 | 3/2017 | Golfieri | | |
| 2018/0114142 A1* | 4/2018 | Mueller | ................ | G06F 16/906 |
| 2019/0052674 A1 | 2/2019 | Wada et al. | | |
| 2019/0332921 A1* | 10/2019 | Rodriguez | ............ | H04L 9/0643 |
| 2020/0028689 A1 | 1/2020 | Vadassery et al. | | |

FOREIGN PATENT DOCUMENTS

| | | |
|---|---|---|
| CN | 112328505 A | 2/2021 |
| LU | 93398 B1 | 7/2018 |
| RU | 2527738 C1 | 9/2014 |
| RU | 2748518 C1 | 5/2021 |

OTHER PUBLICATIONS

U.S. Appl. No. 17/656,020, filed Mar. 23, 2022, Nikita Veshchikov.
U.S. Appl. No. 17/805,568, filed Jun. 6, 2022, Nikita Veshchikov et al.

* cited by examiner

SYSTEM AND METHOD OF FUZZING PREVENTION USING INTENTIONAL RESPONSES THAT APPEAR TO BE RANDOMIZED

BACKGROUND

Field of the Invention

The present invention relates in general to fuzzing prevention, and more particularly to a system and method of impeding fuzzing by selecting responses that appear to be randomized to mislead a fuzzer.

Description of the Related Art

Hackers often analyze a device (or a program) by interacting with the device or the like using any of the protocols that the device expects in an attempt to create a fault or exploit a bug in the code of the device being analyzed. Hackers may try to craft a malicious message that does not exactly follow the rules of a protocol. Before attacking the device, the hacker may attempt to understand how to craft a malicious message that can be used to exploit a bug in the code. Since the source code is rarely available, the hacker often uses "fuzzing" as an analysis technique to discover bugs in the implementation of the target device. Fuzzing is a well-known analysis technique that is used by a hacker or a test programmer to discover bugs in software or in hardware. A "fuzzer" is a hacker or other entity that performs a fuzzing analysis to discover any bugs in a device. Such bugs may represent vulnerabilities that compromise the integrity of the software or hardware and may thus be exploited by a hacker and used to attack the device.

The main idea behind fuzzing is to follow the expected protocol between the devices while introducing random mutations or modifications or the like. Examples of such modifications include random bit flips in messages or changes of the order of messages or parts of a message. If the device does not detect an error in the request message, then it might get into an incoherent situation such as deadlock or it might even crash. Incoherent states that can lead to the crash of the device may be exploited by a hacker. If such problems are not discovered during device manufacturing, they may be discovered by a hacker exposing any vulnerabilities of the device.

BRIEF DESCRIPTION OF THE DRAWINGS

Embodiments of the present invention are illustrated by way of example and are not limited by the accompanying figures. Similar references in the figures may indicate similar elements. Elements in the figures are illustrated for simplicity and clarity and have not necessarily been drawn to scale.

DETAILED DESCRIPTION

A fuzzing prevention technique as described herein can be used to counter a fuzzing campaign against a device or a program by selecting actions in response to fuzzing inputs to stagnate or impede the fuzzing campaign. A "fuzzing campaign" as used herein refers to analysis activities that are used to identify bugs in hardware or software of a device that render the device vulnerable to subsequent attack by a hacker. A person or other entity that conducts a fuzzing campaign, such as a hacker or attacker or the like, is referred to herein as a fuzzer. The fuzzing prevention technique fools the fuzzer into thinking that the fuzzing campaign is progressing when, instead, it has been detected and is, in fact, not actually succeeding. In this manner, fuzzing against a protected device becomes much more difficult and costly to execute potentially leading to fuzzing prevention. A fuzzing prevention technique as described herein concerns reacting to and impeding a fuzzing campaign that has been detected. After fuzzing has been detected using various fuzzing detection techniques, the response may include random-looking outputs that are selected from among a list of actions or responses, such as rebooting the device, requesting some user input, introducing delay after the query, sending a special response, etc. An advantage of a random-looking responses is that they are harder to automate the appropriate reaction for the fuzzer to continue the fuzzing analysis.

As further described herein, upon detecting fuzzing or a fuzzing campaign, a perceptual hash function is used to generate random-looking actions performed in response to fuzzing in order to mislead the fuzzer. The actions performed in response to fuzzing (which may include responses back to the fuzzer) are generated in such a manner that it is difficult to automate the fuzzing campaign and it is also difficult for the fuzzer to distinguish a real error from an intentional "fake" error that has been generated to mislead the fuzzer. A fuzzing prevention technique as described herein causes the fuzzer to spend as much time as possible analyzing fake actions or responses to fuzzing without actually discovering anything that may be used to harm the protected device.

Figure 1:
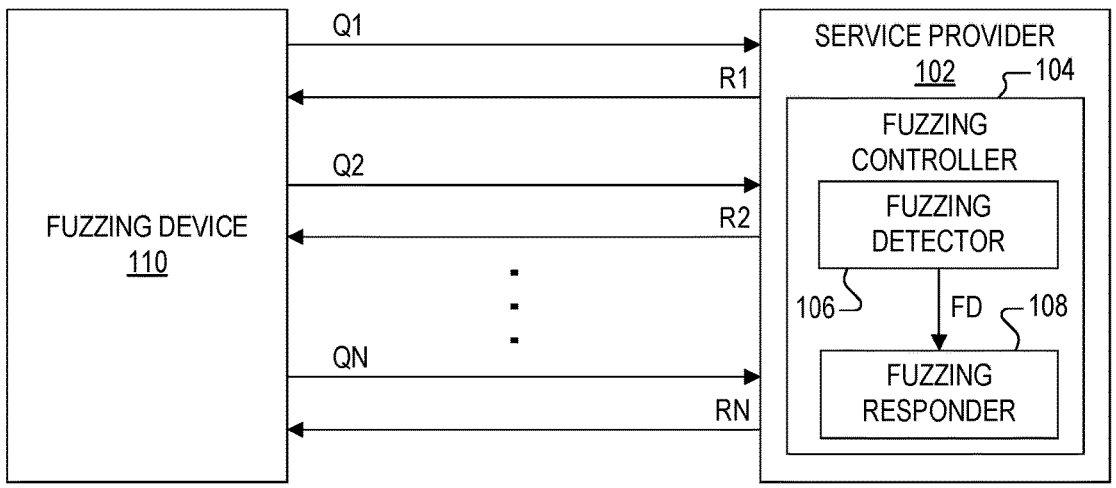
FIG. 1 is a simplified block diagram of a service provider including a fuzzing responder implemented according to one embodiment.

FIG. 1 is a simplified block diagram of a service provider 102 including a fuzzing responder 108 implemented according to one embodiment. In one implementation, the service provider 102 is configured with data and programs and the like to provide data and services or the like in response to inquiries and may be available via a network or the like, such as the Internet. Also shown is a fuzzing device 110 which is being used by a fuzzer to perform a fuzzing campaign against the service provider 102 in an attempt to create a fault or exploit a bug in the code of one or more devices or programs of the service provider 102. In this case the fuzzing device 110 is conducting a fuzzing campaign by "fuzzing" the service provider 102 using multiple queries, shown as Q1, Q2, . . . , QN, provoking the service provider 102 to provide corresponding responses, shown as R1, R2, . . . , RN.

The configuration shown in FIG. 1 is only one example that is shown for the sake of clarity and simplicity using a simple communication protocol. It is appreciated, however, that fuzzing and fuzzing prevention as described herein can be applied to a variety of different use cases and scenarios. Examples of interacting entities include devices, programs on the same device or different devices, a human and one or more devices or one or more programs, etc. Examples of communication methods include a file being used as an input, a message of a protocol being parsed by a program, a request sent using an application programming interface (API), etc.

The service provider 102 includes a fuzzing controller 104 which further includes a fuzzing detector 106 and the fuzzing responder 108. The fuzzing detector 106 incorporates a fuzzing detection mechanism that monitors inputs, which may include one or more of the queries Q1-QN, to detect fuzzing according to any one or more fuzzing detection techniques that are not further described herein. When the fuzzing detector 106 detects fuzzing, it asserts a fuzzing detection signal FD to the fuzzing responder 108. The fuzzing responder 108 responds by setting the service provider 102 into a "fuzzed" mode at least with respect to the fuzzing device 110 and its user (or any of its users). Once in the fuzzed mode, the fuzzing responder 108 takes control of interactions with the fuzzing device 110 and generates "random-looking" but consistent responses for the fuzzer to make them think that one or more errors have been found or are being found. The term "random-looking" means that the response appears to be random to the fuzzer but is in fact selected from a predetermined list of actions based on the fuzzing input as further described herein.

Figure 2:
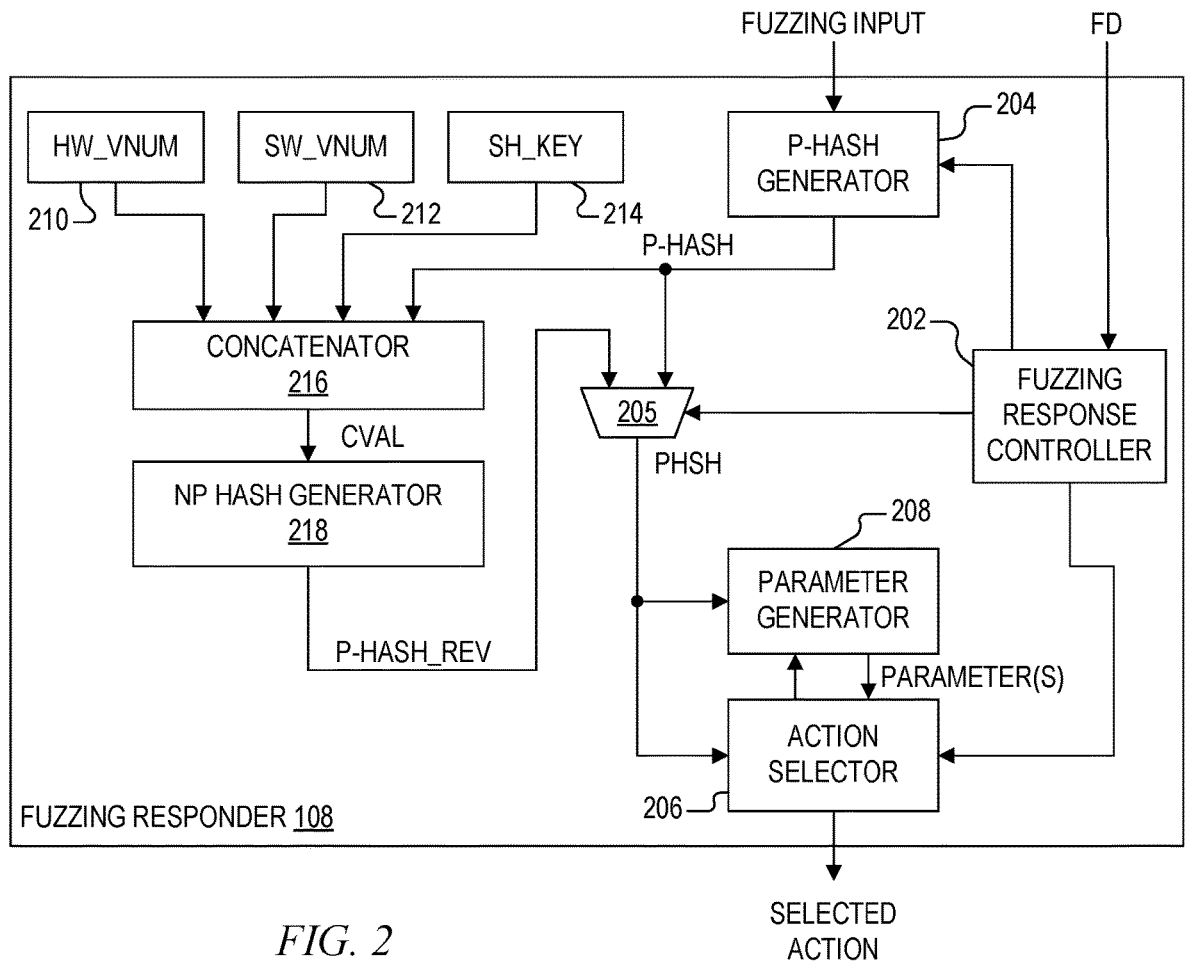
FIG. 2 is a simplified block diagram of the fuzzing responder of FIG. 1 according to one embodiment.

FIG. 2 is a simplified block diagram of the fuzzing responder 108 according to one embodiment. The FD signal is provided to and sensed by fuzzing response controller 202 that activates a P-HASH generator 204 that performs a perceptual hashing function (PHF) on the fuzzing input to generate a perceptual hash value P-HASH. Subsequent inputs received from the fuzzing device 110, including, for example, one or more of the queries Q1-QN, are redirected to an input of the P-HASH generator 204, which generates and outputs corresponding P-HASH values. The PHF operates according to a perceptual hash algorithm. PHFs are hash functions meaning that they map any input to a fixed-sized output. PHFs are not cryptographic hash functions that map to substantially different hash values with similar inputs. In cryptographical hash functions, even a single bit difference between two inputs results in two very different output hash values, such as on average 50% of bits change in the output hash value when only one bit of the input value is modified. Instead, PHFs are used to map similar inputs to the same output value, called the P-HASH value.

There are libraries implementing PHFs that can be used by the P-HASH generator 204, or a special PHF can be generated and used. PHF may be done in several ways including the use of self-supervised machine learning algorithms. This tailored approach helps to create a PHF better suited for a specific given system with a particular protocol, file format, message structure, etc.

In one configuration, the fuzzing response controller 202 controls a multiplexer (MUX) 205 to select the P-HASH value as the perceptual hash value PHSH provided to an action selector 206. The action selector 206 stores or otherwise points to or accesses a list of possible actions to choose from in response to the PHSH value for providing a selected action at its output. In the fuzzed mode as indicated by the fuzzing response controller 202, the selected action is executed in response instead of the normal response to the input or query. In other words, the input from the fuzzing device 110 is redirected to the fuzzing responder 108, and the selected action generated by the fuzzing responder 108 is performed the response to the input from the fuzzing device 110. The selected action may or may not include an actual response to the fuzzing device 110.

Examples of possible actions in the action selector 206 include rebooting the device; logging out the current user (of the fuzzing device 110); deleting some parts of the device's configuration, such as, for example, user data code, resetting to default settings, deleting keys or passwords, etc.; appearing to be stuck such as by not responding to any subsequent inputs or queries until reboot or the like; sending one of multiple standard error message selected as a parameter that can be sent during the normal execution of the protocol such as an error message that is specified by the specified by the format or the standard that the protocol implements; sending a special error message that is not specified by the standard, e.g., "Unexpected error" or "Unexpected error at address XXXX" in which XXXX is a selected parameter; sending a normal (appearing to be random) message of a protocol (such as one specified in the standard), in which the random message is selected as a parameter; and sending a random looking garbage-message instead of a normal response, in which the content of the message is selected as a parameter. This list of actions performed in response to fuzzing is not exhaustive by any means but provides an exemplary number of different actions that can be chosen with different probabilities based on the P-HASH value.

As noted by the possible actions of the action selector 206, some actions need a parameter to complete. The action selector 206 detects that a selected action requires a parameter and prompts a parameter generator 208 to generate and provide one or more parameters to the action selector 206 to formulate the complete action as the response. As described further herein, the PHSH value is also provided to the parameter generator 208 for generating one or more parameters to be used by the selected actions.

Generally, the PHF is used on the input that was received from a fuzzer to generate the P-HASH value, which is the same for identical inputs and is likely the same for similar inputs. The P-HASH value is used to choose the action that the service provider 102 produces to react to the input of the fuzzer as well as to produce parameters for this reaction (if parameters are required). This use of PHF to generate the P-HASH value ensures the same behavior observed by a fuzzer on different devices and on the same device across many trials for the same input. Thus, the fuzzer is duped into thinking that they are finding real errors that might be used to formulate an attack. In fact, however, the fuzzing campaign being conducted by the fuzzing device 110 has been detected and the fuzzing responder 108 essentially "fakes" the responses so that the fuzzer has not discovered any real errors.

The service provider 102 may be updated with new software or new hardware. In either or in both cases, while some of the errors of the older system may have been discovered and fixed in the newer versions, new errors or bugs may also be introduced. A new or updated system likely reacts differently to the same fuzzing inputs from the fuzzer as compared to the old system. A savvy fuzzer may detect fuzzing responses to a fuzzing campaign, which is not desired. The fuzzing responder 108 is configured to minimize detection by a fuzzer when new hardware or software is being used by the service provider 102.

A hardware version number (HW_VNUM) 210, a software version number (SW_VNUM) 212, a secret shared key (SH_KEY) 214, and the P-HASH value may be provided to respective inputs of a concatenator 216, which provides a concatenated value CVAL to an input of a non-perceptual (NP) hash generator 218, which outputs a revised hash value P-HASH-REV. It is noted that each concatenator described herein, including the concatenator 216 and another concatenator 502 (FIG. 5), combines its inputs in a relatively simple manner by appending or prepending on value with another. More complicated combining methods are contemplated using other logical functions, such as logic AND, NAND, OR, NOR, Exclusive-OR (XOR), XNOR, etc., for combining multiple values. It is also noted that any combination of HW_VNUM, SW_VNUM, and SH_KEY may be combined with the P-HASH value to generate P-HASH-REV. P-HASH-REV is provided to another input of the MUX 205, which may be selected by the fuzzing response controller 202 instead of P-HASH as the PHSH value provided to the action selector 206 and to the parameter generator 208. In this manner, instead of using the P-HASH value directly, P-HASH is concatenated with any selected combination of the hardware version number HW_VNUM, the software version number SW_VNUM, and the secret shared key SH_KEY, and the combined value is hashed using a non-perceptual hashing function. The NP hashing function performed by the NP hash generator 218 may be, for example, a cryptographic hash function, or a stream cipher or the like. In this manner, old and new devices do not respond in the same manner to fuzzing inputs and the fuzzer might think that some significant code differences are present in the device and will likely spend more time on the analysis.

In case the use of such system is known to the fuzzer, their goal may be to distinguish real errors or reactions from the fake ones (the ones computed using PHFs). To prevent the fuzzer from doing this, the SH_KEY may be incorporated into the computation. The secret key should be shared across the devices including all devices, or at least those devices that have the same hardware or software version, to ensure different behavior with different versioned devices and identical behavior with the same versioned devices.

Figure 3:
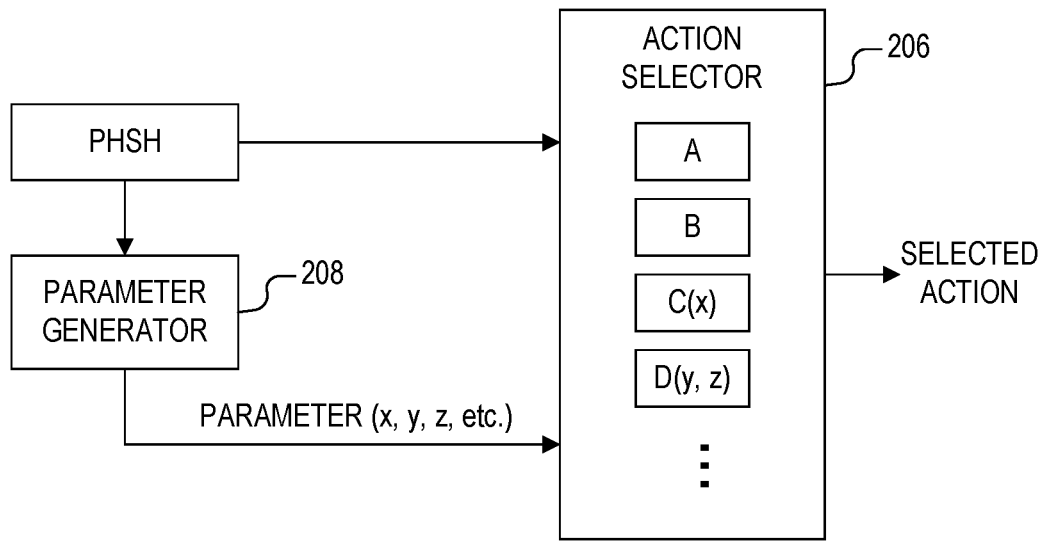
FIG. 3 is a simplified block diagram of action selection and parameter generation used by the fuzzing responder of FIG. 1 according to one embodiment.

FIG. 3 is a simplified block diagram of action selection and parameter generation used by the fuzzing responder 108 according to one embodiment. The action selector 206 identifies a simplified list of actions A, B, C(x), D(x, y), . . . , in which the actions A and B do not need parameters, action C uses a parameter "x", and D uses parameters "y" and "z". Many more actions may be included, each including zero up to any suitable number of parameters. The PHSH value, which is a selected one of the P-HASH value or the P-HASH-REV value, is provided as an input to the action selector 206 to select one of the listed actions A, B, C, D, . . . , as the selected action. When no parameter is needed, such as for the actions A or B, the action selector 206 simply outputs the selected action and operation is completed. The PHSH value is also provided to the parameter generator 208, which outputs corresponding parameters (e.g., x, y, z, etc.) to the action selector 206. When one or more parameters are needed, such as for the actions C or D, the generated parameters from the parameter generator 208 are used as the parameters of the selected action and the action selector 206 outputs the selected action with the generated parameters and operation is completed.

Figure 4:
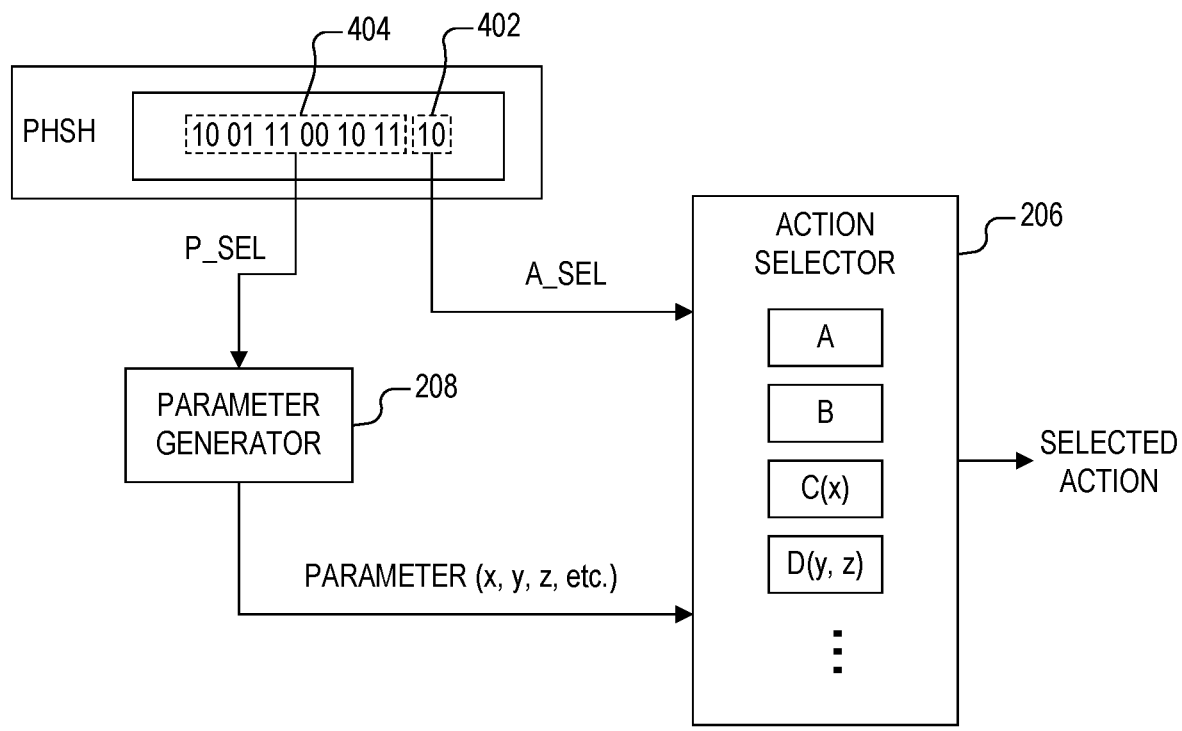
FIG. 4 is a simplified block diagram of action selection and parameter generation used by the fuzzing responder of FIG. 1 according to another embodiment.

FIG. 4 is a simplified block diagram of action selection and parameter generation used by the fuzzing responder 108 according to another embodiment. The action selector 206 and the parameter generator 208 receiving the PHSH value are included in a similar manner as shown in FIG. 3. In this case, however, PVAL may be separated into a lower portion 402 including a number of lower bits and an upper portion 404 including a number of the remaining upper bits. The lower portion 402 may be used as an action select value A_SEL which is applied to the action selector 206 for selecting an action in a similar manner as previously described. The upper portion 404 may be used as a parameter select value P_SEL which is applied to the parameter generator 208 which outputs corresponding parameters (e.g., x, y, z, etc.) to the action selector 206 in a similar manner as previously described. When no parameter is needed, such as for the actions A or B, the action selector 206 simply outputs the selected action and operation is completed. When one or more parameters are needed, such as for the actions C or D, the generated parameters from the parameter generator 208 are used as the parameters of the selected action and the action selector 206 outputs the selected action with the generated parameters and operation is completed.

Figure 5:
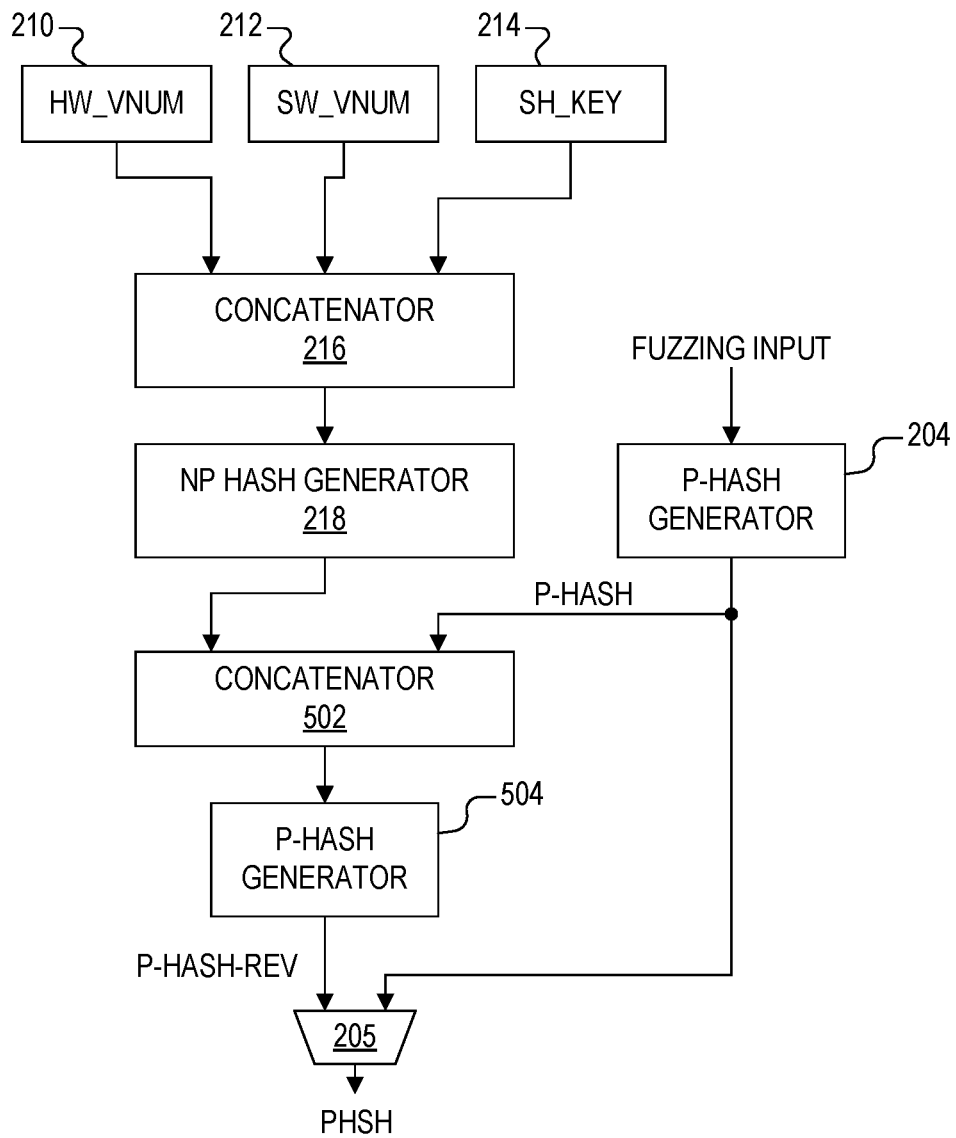
FIG. 5 is a simplified block diagram of an alternative method of generating the perceptual hash value according to another embodiment that may be used within the fuzzing responder of FIG. 1.

FIG. 5 is a simplified block diagram of an alternative method of generating the PHSH value according to another embodiment that may be used within the fuzzing responder 108. Any combination of HW_VNUM 210, SW_VNUM 212, and SH_KEY 214 may be concatenated together (without P-HASH) by the concatenator 216 and the concatenated value is provided to an input of the NP hash generator 218. Again, the non-perceptual hashing function performed by the NP hash generator 218 may be a cryptographic hash function or a stream cipher or the like. The output of the NP hash generator 218 and the P-HASH value from the P-HASH generator 204 are concatenated together by another concatenator 502, and the concatenated (or combined) output is provided to another P-HASH generator 504 providing another revised hash value P-HASH-REV. P-HASH-REV and P-HASH are provided to the inputs of the MUX 205, which selects either one to provide the PHSH value as previously described. Although separate P-HASH generators 204 and 504 are shown, common p-hash circuitry may be used for both.

Figure 6:
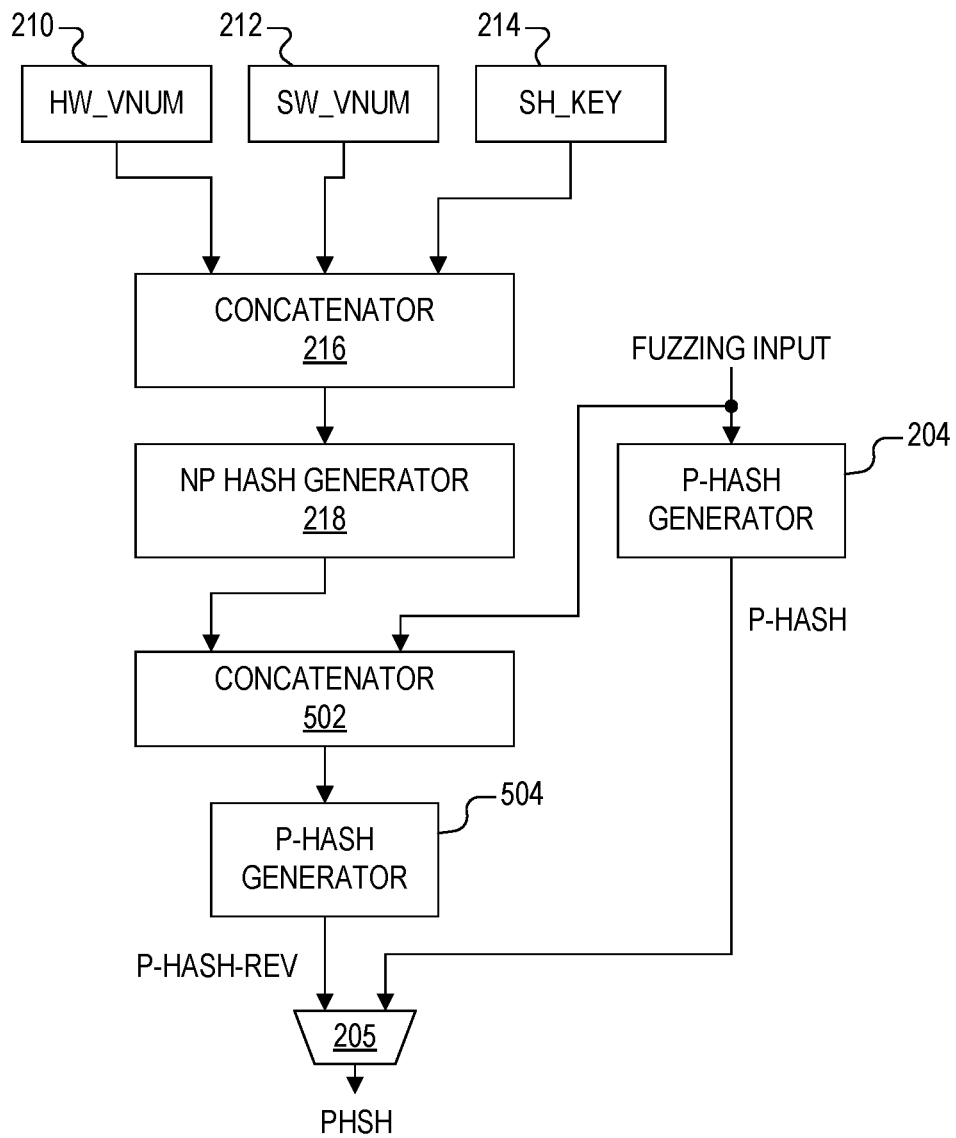
FIG. 6 is a simplified block diagram of an alternative method of generating the perceptual hash value according to another embodiment that may be used within the fuzzing responder of FIG. 1.

FIG. 6 is a simplified block diagram of an alternative method of generating the PHSH value according to another embodiment that may be used within the fuzzing responder 108. The alternative method shown in FIG. 6 is substantially similar to the alternative method shown in FIG. 5 except that INPUT is provided to an input of the concatenator 502 rather than P-HASH for generating P-HASH-REV. Again, P-HASH-REV and P-HASH are provided to the inputs of the MUX 205 for determining the PHSH value as previously described.

Figure 7:
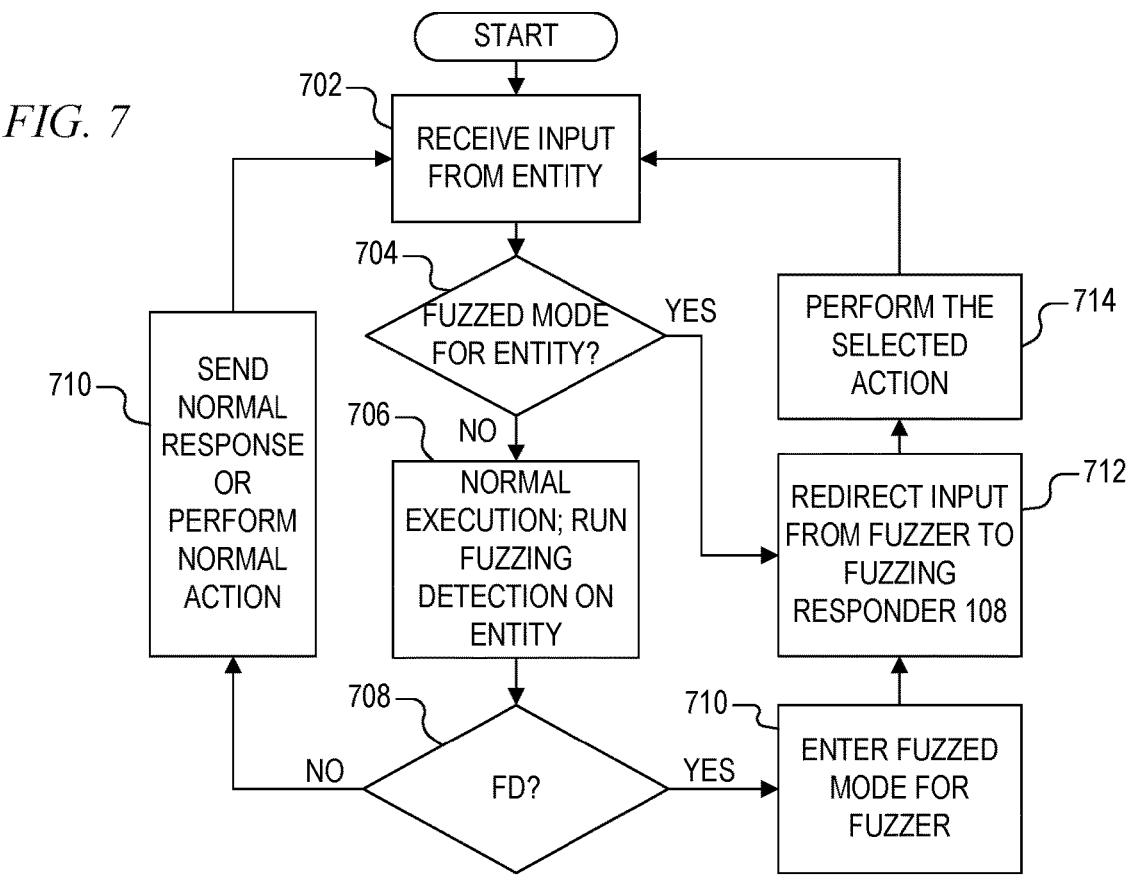
FIG. 7 is a flowchart diagram illustrating operation of the service provider incorporating the fuzzing responder of FIG. 1 implemented according to one embodiment.

FIG. 7 is a flowchart diagram illustrating operation of the service provider 102 incorporating the fuzzing responder 108 implemented according to one embodiment. The service provider 102 represents any device or program that incorporates a fuzzing response system or method as described herein. At a first block 702, an input is received from an entity interfacing the service provider 102, such as, for example, the fuzzing device 110. An entity represents any user or device interfacing the service provider 102 for data or services. At next block 704, it is queried whether the service provider 102 is already in the fuzzed mode for the entity that sent the input. If not, operation proceeds to block 706 in which the service provider 102 performs its normal execution in response to the received input. In addition, the fuzzing detector 106 runs fuzzing detection on the entity. Operation then advances to block 708, in which it is queried whether the FD signal has been asserted by the fuzzing detector 106 indicating fuzzing detection. If not, operation proceeds to block 710 in which the service provider 102 sends its normal response or performs its normal action in response to the received input. Operation then loops back to block 702 for receiving the next input from the entity. Operation may stay at block 702 indefinitely while waiting for the next input, or may loop between blocks 702, 704, 706, 708, and 710 for normal operation while a fuzzing campaign is not detected.

Referring back to block 708, if the fuzzing detector 106 has instead asserted the FD signal indicating that a fuzzing campaign has been detected from the entity, such as, for example, from the fuzzing device 110, operation instead proceeds to block 710 in which the service provider 102 enters the fuzzed mode for that entity, which is now referred to as a fuzzer. It is noted that the service provider 102 may be providing data or services to other entities in which the fuzzed mode may be entered only for those entities for which fuzzing has been detected. Operation then advances to block 712 in which inputs from the fuzzer are redirected to the fuzzing responder 108. Operation then advances to block 714 in which the service provider 102 performs the action selected by the fuzzing responder 108. Depending upon the action performed, operation may loop back to block 702 for receiving the next input from the fuzzer. If and when a subsequent input is received from the fuzzer, then at block 704 operation instead proceeds to block 712 in which each subsequent input is redirected to the fuzzing responder 108. Operation may stay at block 702 indefinitely while waiting for the next fuzzing input, or may loop between blocks 702, 704, 712, and 714 for fuzzing operation in response to the fuzzer.

Figure 8:
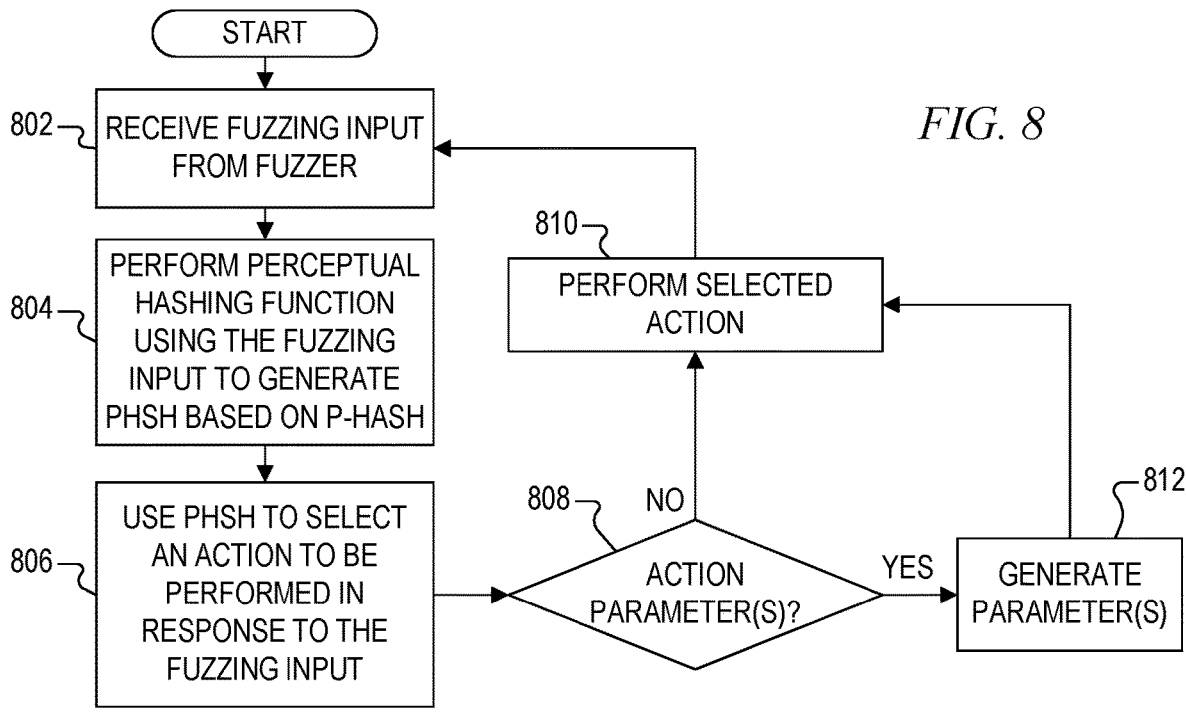
FIG. 8 is a flowchart diagram illustrating operation of the fuzzing responder of FIG. 1 implemented according to an embodiment including any one or more of the embodiments shown in FIGS. 2-6.

FIG. 8 is a flowchart diagram illustrating operation of the fuzzing responder 108 implemented according to an embodiment including any one or more of the embodiments shown in FIGS. 2-6. At first block 802 a fuzzing input is received from a fuzzer such as, for example, the fuzzing device 110. Operation then advances to block 804 in which the perceptual hashing function (PHF) is performed using the fuzzing input to generate the PHSH value based on P-HASH, such as according to any of the embodiments shown in FIGS. 2, 5, and 6. Operation then advances to block 806 to select an action to be performed in response to the fuzzing input, such as any of the actions in the action selector 206. Operation then advances to block 808 in which it is queried whether the selected action needs any parameters. If not, operation advances to block 810 in which the selected action is performed. Depending upon the selected action performed, operation may advance back to block 802 for receiving the next fuzzing input from the fuzzer. Referring back to block 808, if the selected action needs any parameters, operation instead advances to block 812 in which the parameter(s) is/are generated, and then to block 810 to perform the selected action using the generated parameter(s).

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims. For example, variations of positive circuitry or negative circuitry may be used in various embodiments in which the present invention is not limited to specific circuitry polarities, device types or voltage or error levels or the like. For example, circuitry states, such as circuitry low and circuitry high may be reversed depending upon whether the pin or signal is implemented in positive or negative circuitry or the like. In some cases, the circuitry state may be programmable in which the circuitry state may be reversed for a given circuitry function.

The terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method of responding to fuzzing at a service provider device, the method comprising:
   receiving a fuzzing input at a service provider including a controller that is in a fuzzed mode;
   performing, using a perceptual hash generator of a responder circuit of the controller, a perceptual hashing function using the fuzzing input to generate a perceptual hash value;
   selecting, using an action selector of the responder circuit, an action from a plurality of predetermined actions based on a selected value related to the perceptual hash value; and
   performing the selected action in response to the fuzzing input.

2. The method of claim 1, wherein said performing a perceptual hashing function using the fuzzing input comprises generating, using the perceptual hash generator of the responder circuit, the perceptual hash value, wherein the perceptual hash value is the same for a subset of a plurality of possible fuzzing inputs that are considered similar.

3. The method of claim 1, wherein prior to performing the selected action, the method further comprising generating, using a parameter generator, at least one parameter based on at least a portion of the selected value, wherein the at least one parameter is used by the selected action when performed.

4. The method of claim 3, wherein:
   said selecting the action comprises determining, using the action selector of the responder circuit, the action from the plurality of predetermined actions based on a first portion of the selected value related to the perceptual hash value; and
   wherein said generating the at least one parameter comprises determining, using the parameter generator, the at least one parameter based on a second portion of the selected value.

5. The method of claim 1, further comprising:
   combining, using a concatenator of the responder circuit, at least one version number, a shared secret key, and the perceptual hash value to produce a combined value;
   performing, using a non-perceptual hash generator, a non-perceptual hash function on the combined value to produce a revised hash value;

providing the perceptual hash value to a first input of a multiplexer and the revised hash value to a second input of the multiplexer, the multiplexer including an output coupled to the action selector; and providing, from the controller of the responder circuit, a selection input signal to a control input of the multiplexer to selectively provide one of the perceptual hash value or the revised hash value as the selected value to the action selector.

6. The method of claim 1, further comprising:

combining, using a concatenator of the responder circuit, at least one version number and a secret key to produce a combined value;

performing, using a non-perceptual hash generator of the responder circuit, a non-perceptual hash function on the combined value to produce a hash value;

combining, using a second concatenator of the responder circuit, the hash value with the perceptual hash value to produce a second combined value;

performing, using a second perceptual hash generator of the responder circuit, a perceptual hash function on the second combined value to produce a revised hash value;

providing the perceptual hash value to a first input of a multiplexer and the revised hash value to a second input of the multiplexer, the multiplexer including an output coupled to the action selector; and providing, from the controller of the responder circuit, a selection input signal to a control input of the multiplexer to selectively provide one of the perceptual hash value or the revised hash value as the selected value to the action selector.

7. The method of claim 6, further comprising:

combining, using a concatenator of the responder circuit, at least one version number and a secret key to produce a combined value; and performing, using a non-perceptual hash generator of the responder circuit, a non-perceptual hashing function on the combined value to produce a hash value;

combining, using a second concatenator of the responder circuit, the hash value with the fuzzy input to produce a second combined value;

performing, using a second perceptual hash generator of the responder circuit, a perceptual hash function on the second combined value to produce a revised hash value providing the perceptual hash value to a first input of a multiplexer and the revised hash value to a second input of the multiplexer, the multiplexer including an output coupled to the action selector; and providing, from the controller of the responder circuit, a selection input signal to a control input of the multiplexer to selectively provide one of the perceptual hash value or the revised hash value as the selected value to the action selector.

8. A device including a fuzzing responder circuit, the device comprising:

a perceptual hash generator configured to receive a fuzzing input and to perform a perceptual hashing function using the fuzzing input to generate a perceptual hash value;

a concatenator coupled to the perceptual hash generator and configured combine at least one version number, a shared secret key, and either the fuzzing input or the perceptual hash value to generate a revised hash value;

a multiplexer including a first input to receive the perceptual hash value, a second input to receive the revised hash value, a control input, and an output;

a controller coupled to the control input, the controller to provide a control signal to the multiplexer to provide a selected hash value to the output, the selected hash value comprising one of the revised hash value and the perceptual hash value; and an action selector coupled to the output of the multiplexer and configured to select an action from a predetermined list of actions based on at least a portion of the selected hash value; and performing the selected action in response to the fuzzing input.

9. The device of claim 8, further comprising a parameter generator coupled to the output of the multiplexer and to the action selector, the parameter generator configured to use a first portion of the selected hash value to generate at least one parameter for the selected action and to provide the at least one parameter to the action generator, and the action selector configured to use a second portion of the selected hash value to determine the selected action.

10. The device of claim 9, wherein the action selector is configured to use a first portion of the selected hash value to determine the selected action and wherein the parameter generator is configured to use a second portion of the selected hash value to generate the at least one parameter.

11. The device of claim 8, further comprising:

a first combiner configured to combine at least one version number and a shared secret key to produce a combined value and to provide the combined value to an output; and a non-perceptual hash generator coupled to the output of the first combiner and configured to perform a non-perceptual hash function on the combined value to generate a hash value, the non-perceptual hash generator configured to provide the hash value to the concatenator for combining with either the fuzzing input or the perceptual hash value.

12. The device of claim 11, wherein the non-perceptual hash generator comprises cryptographic hash generator.

13. The device of claim 11, wherein the selected action is selected from a group consisting of rebooting the device, logging out a current user of a source associated with the fuzzing input, deleting at least a portion of a configuration of the device, deleting user code data, resetting the device to default settings, deleting keys, deleting passwords, refusing to respond to any queries until reboot, sending a selected one of multiple standard error messages that can be sent during normal execution of a protocol; sending a special error message that is not specified by the protocol or by a standard; and sending a random looking garbage message.

14. The device of claim 11, wherein the at least one version number comprises at least one of a hardware version number and a software version number.

15. A method comprising:

receiving a fuzzing input at a responder circuit;

generating, using a perceptual hash generator of the responder circuit, a perceptual hash value based on a fuzzing input;

combining, using a concatenator of the responder circuit, a shared key and at least one version number, a shared secret key, and either the fuzzing input or the perceptual hash value to generate a revised hash value;

providing, from the concatenator, the perceptual hash value to a first input of a multiplexer of the responder circuit and the revised hash value to a second input of the multiplexer;

providing, from a controller of the responder circuit, a multiplexer selection signal to a control input of the multiplexer to provide a selected hash value to an output of the multiplexer, the selected hash value selected from a group consisting of the perceptual hash value and the revised hash value;

determining, by an action selector of the responder circuit, a selected action from a predetermined list of actions based on at least a portion of the selected hash value; and performing the selected action in response to receiving the fuzzing input.

16. The method of claim 15, wherein, prior to performing the selected action, the method further comprising:

determining, using a parameter generator, at least one parameter based on at least a portion of the selected hash value;

providing the at least one parameter to the action selector, and formulating, using the action selector, a complete action using the at least one parameter to produce the selected action.

17. The method of claim 16, wherein:

determining the at least one parameter comprises determining, using the parameter generator, the at least one parameter based on a first portion of the selected hash value; and determining the selected action comprises determining, using the action selector, the selected action selector based on a second portion of the selected hash value.

18. The method of claim 15, further comprising:

combining, using a first concatenator, at least one version number and a shared secret key to produce a combined value; and generating, using a non-perceptual hash generator, a hash value based on the combined value; and providing the hash value to the concatenator for combining with either the fuzzing input or the perceptual hash value.

19. The method of claim 15, wherein the selected action is selected from a group consisting of rebooting a device, logging out a current user of a source associated with the fuzzing input, deleting at least a portion of a configuration of the device, deleting user code data, resetting the device to default settings, deleting keys, deleting passwords, refusing to respond to any queries until reboot, sending a selected one of multiple standard error messages that can be sent during normal execution of a protocol; sending a special error message that is not specified by the protocol or by a standard; and sending a random looking garbage message.

* * * * *